US008449845B2

(12) United States Patent
Shindo et al.

(10) Patent No.: US 8,449,845 B2
(45) **Date of Patent: *May 28, 2013**

(54) ZIRCONIUM CRUCIBLE

(75) Inventors: Yuichiro Shindo, Ibaraki (JP); Masahiro Sakaguchi, Ibaraki (JP); Mitsuru Yamaguchi, Ibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 732 days.

This patent is subject to a terminal disclaimer.

(21) Appl. No.: 12/188,446

(22) Filed: Aug. 8, 2008

(65) Prior Publication Data

US 2009/0053112 A1 Feb. 26, 2009

(30) Foreign Application Priority Data

Aug. 20, 2007 (JP) ................................ 2007-213690

(51) Int. Cl.

| | |
|---|---|
| ***B01L 3/00*** | (2006.01) |
| ***C22F 1/18*** | (2006.01) |
| ***C22C 38/50*** | (2006.01) |
| ***C22C 38/14*** | (2006.01) |
| ***C01B 21/076*** | (2006.01) |
| ***B01L 3/04*** | (2006.01) |
| *C09C 1/36* | (2006.01) |
| *C22C 38/12* | (2006.01) |
| *C22C 27/00* | (2006.01) |
| *C01B 31/34* | (2006.01) |
| *C01G 27/02* | (2006.01) |

(52) U.S. Cl.

CPC ............... *B01L 3/04* (2013.01); *B01L 2300/12* (2013.01)

USPC ........... 422/557; 422/547; 106/438; 148/672; 420/81; 420/93; 420/109; 420/110; 420/125; 423/297; 423/411; 423/440; 423/594.12; 423/608

(58) Field of Classification Search

USPC ................................................. 422/547, 557

See application file for complete search history.

(56) References Cited

U.S. PATENT DOCUMENTS

| | | | | |
|---|---|---|---|---|
| 3,000,703 | A | 9/1961 | Brugger | |
| 3,758,662 | A | 9/1973 | Tobin et al. | |
| 4,946,490 | A | 8/1990 | Hall et al. | |
| 5,336,378 | A | 8/1994 | Nishimura et al. | |
| 5,980,604 | A * | 11/1999 | Lavernia | 75/338 |
| 6,723,672 | B1 * | 4/2004 | Stuart et al. | 501/104 |
| 2003/0062261 | A1 * | 4/2003 | Shindo | 204/298.13 |
| 2003/0110892 | A1 * | 6/2003 | Nicoloau | 75/594 |
| 2004/0002762 | A1 * | 1/2004 | Hawkins | 623/17.15 |
| 2005/0221088 | A1 | 10/2005 | Celik et al. | |
| 2006/0201589 | A1 * | 9/2006 | Morales et al. | 148/423 |
| 2007/0051440 | A1 * | 3/2007 | Eucken | 148/668 |
| 2007/0196683 | A1 * | 8/2007 | Schlienger et al. | 428/596 |
| 2009/0104082 | A1 * | 4/2009 | Sakaguchi et al. | 422/102 |
| 2010/0167407 | A1 | 7/2010 | Sakaguchi et al. | |

FOREIGN PATENT DOCUMENTS

| | | | |
|---|---|---|---|
| JP | 45-038971 | A | 12/1970 |
| JP | 10-132801 | A | 5/1998 |
| JP | 2004-069413 | A | 3/2004 |
| WO | 2007/097241 | A1 | 8/2007 |
| WO | 2007/138768 | A1 | 12/2007 |

OTHER PUBLICATIONS esp@cenet database, One Page English Abstract of JP 10-038773 A, Feb. 13, 1998.

esp@cenet database, One Page English Abstract of JP 02-172540 A, Jul. 4, 1990.

esp@cenet database, One Page English Abstract of JP 58-048854 A, Mar. 22, 1983.

esp@cenet database, One Page English Abstract of JP 2005-114505 A, Apr. 28, 2005.

U.S. Office Action dated Oct. 1, 2010 issued in co-pending U.S. Appl. No. 12/297,789.

U.S. Office Action dated Aug. 13, 2010 issued in co-pending U.S. Appl. No. 12/278,889.

* cited by examiner

*Primary Examiner* — Bobby Ramdhanie

*Assistant Examiner* — Jennifer Wecker

(74) *Attorney, Agent, or Firm* — Howson & Howson LLP

(57) ABSTRACT

In light of the recent analytical technology demanded of fast and accurate measurement of high purity materials, a zirconium crucible is provided for melting an analytical sample and is capable of inhibiting the inclusion of impurities from the crucible by using a high-purity crucible, improving the durability of high-purity zirconium as an expensive crucible material, and increasing the number of times that the zirconium crucible can be used. With this zirconium crucible used for melting an analytical sample in the pretreatment of the analytical sample, the purity excluding gas components is 3N or higher, and the content of carbon as a gas component is 100 mass ppm or less.

15 Claims, No Drawings

ZIRCONIUM CRUCIBLE

BACKGROUND OF THE INVENTION

The present invention relates to a zirconium crucible for melting an analytical sample capable of inhibiting the inclusion of impurities from the crucible and increasing the number of times that the crucible can be used.

In recent years, demands for measuring high purity materials quickly and accurately are on the rise. As such demands increase, there is a problem in that the measurement result will differ depending on how skilled the analyst is, and reanalysis must be performed from time to time in order to confirm the reliability of the initial analysis.

A sample for analysis is generally prepared by melting the sample with a flux. The process of melting the sample with a flux is usually based on a melting method such as carbonate (alkali) fusion, alkali hydroxide fusion, sodium peroxide fusion, or sodium hydrogensulfate fusion.

Among the above, sodium peroxide has strong oxidizing power, and is a favorable flux. Although an iron or nickel crucible is often used as the melting crucible in the foregoing case, it is necessary to note that the crucible will be severely affected.

Although the ratio of mixing the sodium peroxide will differ depending on the nature of the sample in the sodium peroxide fusion, generally 5 to 10 parts in weight of sodium peroxide is used in relation to the sample weight (refer to Non-Patent Document 1). In addition, the heating temperature must also be adjusted depending on the sample, and this is decided entirely by experience.

Although the quantitative value was sought by subtracting the blank of the crucible conventionally, variation in the blank depends largely on the skill of the analyst. Further, since a conventional zirconium crucible has a purity level of 99 wt % (2N), impurities from the crucible would get mixed in, the lower limit of determination would become high as a result of the mixture of such impurities, and this was insufficient for the analysis of recent high purity samples.

Although there are not many Patent Documents that describe an analytical means to handle the foregoing high purity materials, to introduce some materials that may be of reference, for instance, there is technology that relates to the method of adjusting a sample for performing qualitative and quantitative analysis of such sample, whereby the sample is placed on a metal foil and subject to thermolysis together with such metal foil, and further made into a solution (refer to Patent Document 1). Nevertheless, this is an extremely atypical type of method, and lacks versatility.

Further, a chemical analysis crucible composed from Pt alloy or Pd alloy in which 5 to 90 wt % of Pd is added to Pt that uses an alkali flux to perform chemical analysis of ores is disclosed (refer to Patent Document 2). Nevertheless, there is a problem in that this technology is impractical since it is subject to the use of expensive crucible materials.

In addition, a method of analyzing the rhodium content in a film by heating and melting a rhodium-ruthenium alloy plating film in a nickel crucible with sodium peroxide or potassium peroxide is disclosed (refer to Patent Document 3). Nevertheless, Patent Document 3 does not in any way disclose the purity of the crucible. It is therefore strongly assumed that the crucible of Patent Document 3 has a conventional purity level (2N level). Thus, there is a problem in that the lower limit of determination is high due to the inclusion of impurities, and high precision analysis cannot be performed.

[Non-Patent Document 1] "Analysis" Introductory Course, Issued in October 1979, "Reagent Used in Dissolution" Pages 648 to 655.

[Patent Document 1] Japanese Patent Laid-Open Publication No. H10-38773.

[Patent Document 2] Japanese Patent Laid-Open Publication No. H2-172540.

[Patent Document 3] Japanese Patent Laid-Open Publication No. S58-48854.

SUMMARY OF THE INVENTION

In light of the recent analytical technology demanded of fast and accurate measurement of high purity materials, an object of the present invention is to provide a zirconium crucible for melting an analytical sample capable of inhibiting the inclusion of impurities from the crucible by using a high-purity crucible, improving the durability of high-purity zirconium as an expensive crucible material, and increasing the number of times that the zirconium crucible can be used.

In order to achieve the foregoing object, the present invention provides a zirconium crucible used for melting an analytical sample in the pretreatment of the analytical sample, wherein the purity excluding gas components is 3N (99.9%) or higher, and the content of carbon as a gas component is 100 mass ppm or less.

Preferably, the carbon content is 50 mass ppm or less, and most preferably the carbon content is 10 mass ppm or less. Further, an average grain size of the zirconium crucible material is preferably 500 μm or less, more preferably 100 μm or less, or most preferably 10 μm or less.

As a result of using a zirconium crucible in which the purity excluding gas components is 3N or higher and the content of carbon as a gas component is 100 mass ppm or less, the present invention yields a superior effect in that it is able to inhibit the inclusion of impurities from the crucible and perform high-purity analysis, save the labor time and mitigate the amount of sample to be used, and, therefore, the present invention is able to meet the demands of recent analytical technology which require fast and accurate measurement of high purity materials. The present invention additionally yields a significant effect in that it is capable of improving the durability of high-purity zirconium as an expensive crucible material, and increasing the number of times that the zirconium crucible can be used.

DETAILED DESCRIPTION OF THE INVENTION

As the zirconium crucible used for melting an analytical sample in the pretreatment of such analytical sample according to the present invention, a zirconium crucible having a purity of 3N or higher is used. The general procedures for performing the analysis of the present invention are as follows:

(1) Place the sample in the zirconium crucible;
(2) Add a flux, such as an alkali flux, to the crucible;
(3) Heat the crucible with a burner or a muffle furnace and melt the flux and sample;
(4) Transfer the sample to a PTFE beaker or the like;
(5) Add acid and the like;
(6) Heat the beaker and dissolve the sample;
(7) Transfer the sample to a volumetric flask;
(8) Add water until the liquid measure becomes a prescribed value; and
(9) Measure the result with an ICP-AES or the like.

In order to perform high-precision analysis, it is necessary to reduce the contamination from the crucible, and indeed, there is hardly any problem in the analytical precision with a high-purity crucible having a purity level of 4N or higher. Applicant has previously filed a patent application relating to a high-purity Zr crucible (refer to Japanese Patent Application No. 2006-146971).

Nevertheless, even with a high-purity Zr crucible, it has been discovered that there is variation in the reduction of the weight of the crucible after use, and also in some cases, the reduction in weight is significant. Since high-purity zirconium is expensive, the number of times that the crucible can be used should be at least 10 times or more.

The significant weight reduction not only affects the measurement accuracy but also causes a problem in that the crucible itself will become fragile, and the number of times that the crucible can be used decreases considerably.

Upon investigating the cause of this phenomenon, it has been discovered that this phenomenon is caused particularly by the carbon (C) existing as a solid solution in the zirconium (Zr) as a gas component. This is considered to be because C is in the state of a solid solution in the Zr at high temperatures during the production of a Zr crucible, but is deposited to the grain boundary at room temperature.

In particular, with a (low-purity) Zr crucible having numerous impurities, the impurities and C in the crucible form a compound, and, during the process of using the crucible and melting the sample, this compound (impurity) behaves like an etch pit and elutes, and this is considered to cause the reduction in weight of the crucible.

In addition, even when using a (high-purity) Zr crucible without many impurities, if it contains large amounts of C, it has been discovered that the reduction in weight is similarly significant. Although the high purification of the zirconium crucible is desirable as a matter of course, it has been confirmed that the restriction of this carbon content is extremely important. By restricting the carbon content, it has been confirmed that the analytical precision improves even with a 3N-level crucible, and the durable period of the crucible increases.

As described above, restriction of the C content must be primarily considered in a zirconium crucible, but the grain size is also a problem in respect of the reduction of weight of the crucible after use.

Since zirconium comprises a hexagonal closed packed (HCP) structure, and is easily oriented toward a specific face, the elution behavior will differ considerably depending on the crystal face.

In order to inhibit the foregoing phenomenon, it is desirable to miniaturize the crystal grains as much as possible and reduce the bias of elution.

As described above, purity, C content, and crystal grains are factors that cause reduction in weight, and primary consideration should be given to the purity of the zirconium crucible and restriction of the C content as the gas component. Preferably, the purity of the Zr crucible excluding gas components is 3N or higher, and the C content is preferably 100 mass ppm or less, more preferably 50 mass ppm or less, and most preferably 10 mass ppm or less.

Thereby, the reduction in weight of the zirconium crucible will be minimized, and it is possible to effectively inhibit the zirconium crucible from becoming fragile. Incidentally, as other gas components that get mixed into the zirconium crucible material, there are oxygen, nitrogen and the like, but it has been confirmed that these gas components do not affect the reduction in weight.

As secondary consideration, it is preferable to control the grain size. Preferably, the grain size is 500 μm or less, more preferably 100 μm or less, and most preferably 10 μm or less. As the C content decreases, the grain size becomes larger, and it is necessary to adjust the grain size during the production of the crucible.

As described above, by combining the adjustment of the grain size and restriction of the carbon content, it is possible to further inhibit the crucible from becoming fragile, and increase the number of times that the analytical crucible can be used.

EXAMPLES

The present invention is now explained based on the Examples and Comparative Examples. The Examples merely illustrate a preferred example, and the present invention shall in no way be limited thereby. In other words, all modifications, other embodiments and modes covered by the technical spirit of the present invention shall be included in this invention.

Example 1

A high-purity zirconium crucible with a purity of 99.95% and C content as a gas component of <10 mass ppm was used, and the quantity of impurities of Zr, Si, Fe, and Al in $SnO_2$ was determined. Thereafter, 0.5 g of $SnO_2$ as the sample was placed in the high-purity zirconium crucible, 3 g of sodium peroxide flux was used, and was heated with a burner to melt the sample.

As a result of performing this operation, the weight of the crucible decreased by approximately 0.1%. There was no corrosion at the grain boundary, and consequently this crucible could be used for analysis approximately 50 to 80 times.

The oxygen and nitrogen content in the crucible before use were respectively 700 mass ppm and <10 mass ppm, but there was no change even after use. The average grain size in this case was approximately 5 μm. The zirconium crucible shown in Example 1 is a standard crucible of the present invention.

Examples 2 to 4

Subsequently, zirconium crucibles with a purity of 99.995% (Example 2), a purity of 99.99% (Example 3) and a purity of 99.9% (Example 4), and C content as a gas component and grain size equivalent to Example 1 were used, and samples were melted under the same conditions as Example 1.

Consequently, with Example 2, although the weight of the crucible decreased by approximately 0.1%, there was no corrosion at the grain boundary, and the crucible could be used for analysis approximately 50 to 100 times. This should be because the highest purity zirconium crucible was used in Example 2.

In Example 3, although the weight of the crucible decreased by approximately 0.1%, there was no corrosion at the grain boundary, and the crucible could be used for analysis approximately 50 times or more. With Example 3 also, the minimal reduction in weight is considered to be caused by the use of a crucible with a higher purity in comparison to Example 1.

In Example 4, the weight of the crucible decreased by approximately 0.3%, there was slight corrosion at the grain boundary, elution of impurities was observed, and the crucible became fragile. The oxygen and nitrogen content in the crucible were 700 mass ppm and <10 mass ppm before use, and rose to 850 mass ppm and 10 mass ppm after use. The crucible could be used for analysis approximately 20 to 30 times. Although in Example 4 a crucible with a lower purity was used in comparison to Example 1, the reduction in weight increased, and Example 4 was still within a range where it could be used as a crucible.

Example 5 to Example 9

Subsequently, a high-purity zirconium crucible with a purity of 99.95%, which is equivalent to Example 1, in the case of respectively changing the C content as the gas component to approximately 100 mass ppm, approximately 80 mass ppm, approximately 50 mass ppm, approximately 30 mass ppm, and approximately 10 mass ppm was used, and, as with Example 1, 0.5 g of the sample was placed in the high-purity zirconium crucible, 3 g of sodium peroxide flux was used, and this was heated with a burner to melt the sample.

As a result of performing this operation, the weight of the crucible decreased by approximately 0.3%, approximately 0.3%, approximately 0.2%, approximately 0.2%, and approximately 0.1%. There was corrosion at the grain boundary and elution of impurities was observed when the C content is high, but these phenomena were hardly observed when the C content is 50 mass ppm or less and, consequently, this crucible could be used for analysis approximately 20 to 30 times, approximately 25 to 35 times, 40 to 60 times, 40 to 60 times, and 50 times or more.

Although the foregoing Examples used the 99.95% purity high-purity zirconium crucible of Example 1, the number of times that the crucible can be used tended to increase when a higher purity zirconium crucible was used.

Example 10 to Example 12

Subsequently, a high-purity zirconium crucible with a purity of 99.95% and C content as a gas component of <10 mass ppm, which is equivalent to Example 1, in the case of changing the average grain size to approximately 500 μm, 100 μm, and 10 μm was used, as with Example 1, 0.5 g of the sample was placed in the high-purity zirconium crucible, 3 g of sodium peroxide flux was used, and this was heated with a burner to melt the sample.

As a result of performing this operation, the weight of the crucible decreased slightly in the range of approximately 0.2 to 0.1%. The number of times that the crucible could be used for analysis was approximately 30 to 50 times when the average grain size was approximately 500 μm, approximately 50 to 70 times when the average grain size was approximately 100 μm, and approximately 50 to 80 times when the average grain size was approximately 10 μm. Although the reduction in weight of the crucible tends to increase slightly if the grain size is large, this is not conclusive. Nevertheless, it is obvious that smaller the grain size the better.

Incidentally, in a case where the grain size was approximately 100 μm, the carbon concentration was adjusted to approximately 30 mass ppm, and in a case where the grain size was approximately 10 μm, the carbon concentration was adjusted to approximately 90 mass ppm in order to miniaturize the grain size. When the oxygen and nitrogen content were lower, the workability during the production of the zirconium crucible tended to be favorable.

Comparative Example 1

A zirconium crucible with a purity of 99% and C content as a gas component of 100 ppm was used, and the same operation as Example 1 was performed. Consequently, the weight reduction ratio of the crucible was approximately 2%. In addition, a phenomenon of Al, Si and Fe eluting from the zirconium crucible was observed.

In particular, the grain boundary was subject to corrosion, and the crucible became fragile. The crucible could be used only several times, and the result was unsatisfactory as the durability of the expensive zirconium crucible. The oxygen and nitrogen content in the crucible were 700 mass ppm and <10 mass ppm before use, but increased to 2700 mass ppm and 50 mass ppm after use respectively.

Comparative Example 2

A zirconium crucible with a purity of 99% and C content as a gas component of <10 ppm was used, and the same operation as Example 1 was performed. Consequently, the weight reduction ratio of the crucible was approximately 1%. In addition, a phenomenon of Al, Si and Fe eluting from the zirconium crucible was observed. In particular, the grain boundary was subject to corrosion, and the crucible became fragile. The crucible could only be used 10 times at the most. Although the increase in content was not as inferior as Comparative Example 1, the oxygen and nitrogen content in the crucible were 700 mass ppm and <10 mass ppm before use, but increased to 1700 mass ppm and 30 mass ppm after use respectively.

Comparative Example 3

A zirconium crucible with a purity of 95%, C content as a gas component of 500 ppm and average grain size of 0.2 mm was used, and the same operation as Example 1 was performed. Consequently, the weight reduction ratio of the crucible was approximately 5%. In addition, a phenomenon of Al, Si and Fe eluting from the zirconium crucible was observed. In particular, the grain boundary was subject to corrosion, and the crucible became fragile. Thus, the crucible could be used only once. The oxygen and nitrogen content in the crucible were 700 mass ppm and <10 mass ppm before use, but increased to 7500 mass ppm and 230 mass ppm after use respectively.

Comparative Example 4

A zirconium crucible with a purity of 95.95%, C content as a gas component of 500 ppm and average grain size of approximately 1 mm; in other words, a crucible with high purity but high C content and large grain size was used, and the same operation as Example 1 was performed.

Consequently, the weight reduction ratio of the crucible was low and a phenomenon of Al, Si and Fe eluting from the zirconium crucible was not observed. Nevertheless, the grain boundary was subject to corrosion, and the crucible became fragile. Thus, the crucible could only be used several times. The oxygen and nitrogen content in the crucible were 1200 mass ppm and <10 mass ppm before use, but increased to 3500 mass ppm and 230 mass ppm after use respectively.

As a result of using a zirconium crucible in which the purity excluding gas components is 3N or higher and the content of carbon as a gas component is 100 mass ppm or less, the present invention yields a superior effect in that it is able to inhibit the inclusion of impurities from the crucible and perform high-purity analysis, save the labor time and mitigate the amount of sample to be used, and, therefore, the present invention is able to meet the demands of recent analytical technology which require fast and accurate measurement of high purity materials. The present invention additionally yields a significant effect in that it is capable of improving the durability of high-purity zirconium as crucible material, and increasing the number of times that the zirconium crucible can be used.

It is thereby possible to inhibit the inclusion of impurities from the crucible and perform high-purity analysis, and save the labor time and mitigate the amount of sample to be used. Thus, the present invention is able to meet the demands of recent analytical technology which require fast and accurate measurement of high purity materials.

The invention claimed is:

1. A zirconium crucible comprising a grain boundary, used for melting an analytical sample in the pretreatment of the analytical sample, wherein purity excluding gas components of the zirconium crucible is 3N or higher, and a content of carbon as a gas component of the zirconium crucible is 100 mass ppm or less, and an average grain size of the zirconium of the crucible is 500 μm or less, wherein there is no corrosion at the grain boundary.

2. A zirconium crucible according to claim 1, wherein the carbon content is 50 mass ppm or less.

3. A zirconium crucible according to claim 2, wherein the average grain size of the zirconium of the crucible is 100 μm or less.

4. A zirconium crucible according to claim 2, wherein the average grain size of the zirconium of the crucible is 10 μm or less.

5. A zirconium crucible according to claim 1, wherein the carbon content is 10 mass ppm or less.

6. A zirconium crucible according to claim 5, wherein the average grain size of the zirconium of the crucible is 100 μm or less.

7. A zirconium crucible according to claim 5, wherein the average grain size of the zirconium of the crucible is 10 μm or less.

8. A zirconium crucible according to claim 1, wherein the average grain size of the zirconium of the crucible is 100 μm or less.

9. A zirconium crucible according to claim 1, wherein the average grain size of the zirconium of the crucible material is 10 μm or less.

10. A zirconium crucible according to claim 1, wherein an average grain size of the zirconium crucible is 10 μm to 500 μm.

11. A zirconium metal crucible comprising a grain boundary, for use in melting an analytical sample during pretreatment of the analytical sample, wherein the zirconium metal crucible consists of zirconium metal and unavoidable impurities and has a purity, excluding gas component impurities, of 3N (99.9%) or higher and a content of carbon as a gas component impurity of 100 mass ppm or less, and wherein the zirconium metal crucible has an average grain size of 500 μm or less, wherein there is no corrosion at the grain boundary.

12. A zirconium metal crucible according to claim 11, wherein the average grain size of the metal crucible is 10 μm to 500 μm.

13. A zirconium metal crucible according to claim 11, wherein the carbon content is 50 mass ppm or less.

14. A zirconium metal crucible according to claim 11, wherein the average grain size of the metal crucible is 100 μm or less.

15. A zirconium metal crucible according to claim 11, wherein the average grain size of the metal crucible is 10 μm or less.

* * * * *